| United States Patent [19]
Iwata

[11] Patent Number: 5,070,800
[45] Date of Patent: Dec. 10, 1991

[54] CAM UNIT AND SEWING MACHINE EMPLOYING SAME
[75] Inventor: Masanari Iwata, Aichi, Japan
[73] Assignee: Mitsubishi Denki K.K., Tokyo, Japan
[21] Appl. No.: 584,026
[22] Filed: Sep. 18, 1990
[30] Foreign Application Priority Data
Mar. 19, 1990 [JP] Japan .................................. 2-69415
[51] Int. Cl.⁵ .......................................... D05B 27/06
[52] U.S. Cl. ..................................... 112/311; 74/569
[58] Field of Search ............... 112/311, 303, 320, 323; 74/25, 27, 55, 567, 569, 53, 54, 107

[56] References Cited
U.S. PATENT DOCUMENTS

| 2,704,331 | 3/1955 | Stott et al. ........................ 74/55 X |
| 3,427,888 | 2/1969 | Rheinländer ........................ 75/55 |
| 4,199,995 | 4/1980 | Murakami ........................ 74/55 X |
| 4,503,794 | 3/1985 | Ishihara ........................ 112/313 |
| 4,612,867 | 9/1986 | Rösch et al. ........................ 112/314 |
| 4,838,114 | 6/1989 | Stidworthy ........................ 74/569 X |
| 4,848,254 | 7/1989 | Krowatchek et al. .............. 112/313 |

FOREIGN PATENT DOCUMENTS

62-129091 6/1987 Japan .

Primary Examiner—Werner H. Schroeder
Assistant Examiner—Paul C. Lewis
Attorney, Agent, or Firm—Sughrue, Mion, Zinn Macpeak & Seas

[57] ABSTRACT

A cam unit comprising a main cam; a first auxiliary cam provided in contact with the main cam; a second auxiliary cam provided in contact with the first auxiliary cam; a rod provided between the main cam and the second auxiliary cam and having a slenderly shaped hole in which the peripheral portion of the first auxiliary cam is located in contact with the rod so that the rod is swung while being guided by the first auxiliary cam; a motion transmission means secured to the rod and located on the peripheral portion of the main cam so as to move the rod in accordance with the contour of the main cam; a jump prevention means secured to the rod and located on the peripheral portion of the second auxiliary cam so as to prevent the motion transmission means from jumping from the main cam; and a shaft extending through all the cams. A positive cam is constituted by the main cam, the auxiliary cams and the rod without guiding a driven member to straightly move it. A motion is directly transmitted to a swinging member by the cam unit.

9 Claims, 7 Drawing Sheets

FIG. 11 PRIOR ART

CAM UNIT AND SEWING MACHINE EMPLOYING SAME

BACKGROUND OF THE INVENTION

The present invention relates to a cam unit for converting a rotary motion into a reciprocative motion, and also relates to a sewing machine employing the cam unit.

Figure 4:
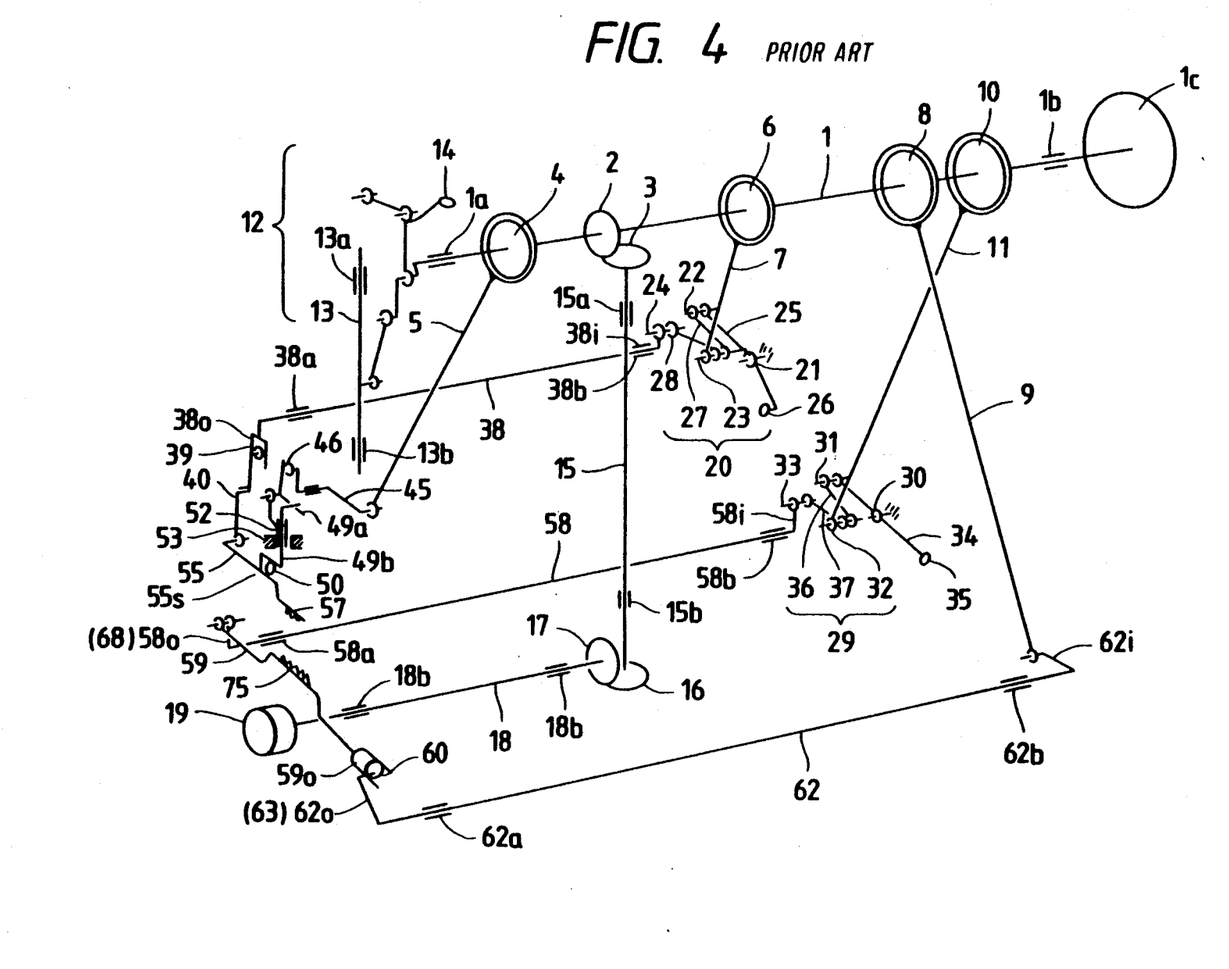
FIG. 4 is a structural view of a conventional differential vertical sewing machine.

FIG. 4 shows the constitution of a conventional differential vertical sewing machine in which a main shaft 1 is supported by bearings 1a and 1b so that the shaft is rotated by a motor not shown in the drawing. The left-hand end of the main shaft 1 is coupled to a needle rod and thread take-up mechanism 12 made of a needle rod 13 and a thread take-up lever 14. The needle rod 13 is guided by bearings 13a and 13b. A flywheel 1c is mounted on the main shaft 1 at the right-hand end thereof. Four eccentric wheels 4, 6, 8 and 10 for causing an upper feed vertical driving force (i), an upper feed horizontal driving force (ii), a lower feed vertical driving force (iii) and a lower feed horizontal driving force (iv), respectively, and a bevel gear 2 for transmitting the torque of the main shaft 1 to a lower shaft 18 are attached to the central portion of the main shaft. The lower shaft 18 is rotatably supported by bearings 18a and 18b. A bevel gear 17 and a shuttle hook 19 are attached to the lower shaft 18 at the right-hand end and left-hand end thereof, respectively. A vertical shaft 15 is supported by bearings 15a and 15b. Bevel gears 3 and 16 are mounted on the vertical shaft 15 a the upper and lower ends thereof, respectively, and engaged with the bevel gears 2 and 17, respectively. An upper feed shaft 38 is rotatably supported by bearings 38a and 38b. The input portion 38i of the upper feed shaft 38 at the right-hand end thereof is coupled to an upper feed quantity controller 20 by a pin 24. The output portion 38o of the shaft 38 at the left-hand end thereof is split into two parts and surrounds a member 39 rotatably supported by the input end portion of a horizontal driving lever 40. An upper feed dog 55 is provided with upper feed teeth 57 at the front end of the dog and is rotatively coupled at the rear end of the dog to the lower end of the horizontal driving lever 40. The two-split front portion of the upper feed dog 55 surrounds a cam follower 50 rotatably supported on a rod 49b at the lower end thereof. The rod 49b is slidably supported by the body 53 of a head. A driving lever 45 is rotatably supported at the central portion thereof. A cam follower 46 is attached to the driving lever 45 at the output portion thereof. The lever 45 is rotatively coupled at the input portion thereof to a rod 5 at the lower end thereof. The rod 5 is rotatively coupled at the upper end thereof to the eccentric wheel 4. An upper feed vertical motion lever 49a shaped as L is rotatably supported by a lifter attaching rod 52 supported by the head body 53 so as to be vertically slidable. The vertical portion of the lever 49a is engaged with the cam follower 46. The horizontal portion of the lever 49a is engaged with the bottom of the upper horizontal portion of the rod 49b. A rod 7 is rotatively coupled at the upper portion thereof to the eccentric wheel 6, and coupled at the lower end portion of the rod to the upper feed quantity controller 20. The controller 20 includes a control lever 25, an auxiliary lever 27 and a coupling lever 28 which are supported to be tunable about the axis of the fixed shaft 21 secured to the head body 53, a pin 22 for rotatively coupling the control lever and the auxiliary lever to each other, a pin 23 for rotatively coupling the auxiliary lever and the coupling lever to the rod 7 at the lower end thereof, and a pin 24 for rotatively coupling the coupling lever to the input portion 38i of the upper feed horizontal motion shaft 38. A lower feed horizontal motion shaft 58 is rotatably supported by bearings 58a and 58b and coupled at the input portion 58i of the shaft to a lower feed quantity controller 29. The output portion 58o of the shaft 58 is rotatively coupled to a feed dog 59 at the rear end thereof. The feed dog 59 has feed teeth 25 on the central part of the portion. The front end portion 59o of the dog 59 is split into two parts. A lower feed vertical motion shaft 62 is rotatably supported by bearings 62a and 62b, and rotatively coupled at the output portion 62o of the shaft to a member 60. The output portion 62o of the shaft 62 is surrounded by the two-split portion of the feed dog 59. The input portion 62i of the shaft 62 is rotatively coupled to a rod 9 at the lower end thereof. The upper portion of the rod 9 is rotatively coupled to the eccentric wheel 8. A rod 11 is rotatively coupled at the upper portion thereof to the eccentric wheel 10 and coupled at the lower end of the rod to the lower feed quantity controller 29. The controller 29 includes a control lever 34, an auxiliary lever 36 and a coupling lever 37 which are supported to be tunable about the axis of the fixed shaft 30 secured to the head body 53, a pin 31 for rotatively coupling the control lever and the auxiliary lever to each other, a pin 32 for rotatively coupling the auxiliary lever and the coupling lever to the road 11 at the lower end thereof, and a pin 33 for coupling the coupling lever to the input portion of the lower feed horizontal motion shaft 58.

Figure 5:
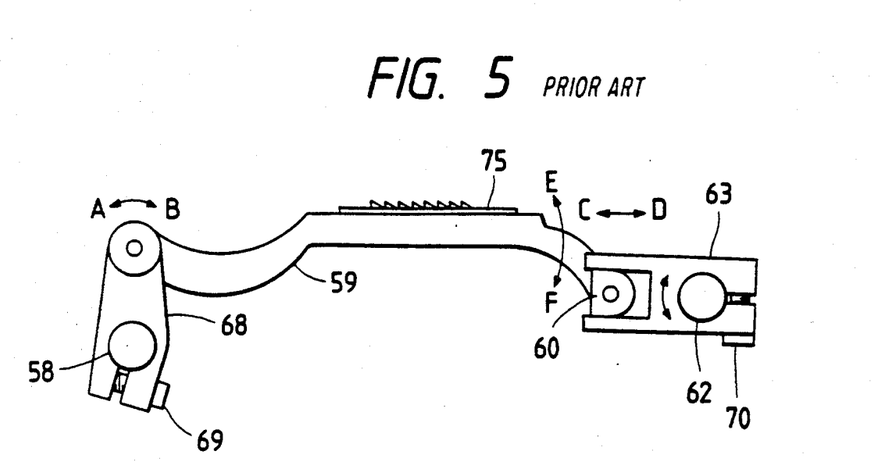
FIG. 5 is a view of the lower feed mechanism of another conventional differential vertical sewing machine.

FIG. 5 shows an enlarged partial view of another conventional differential vertical sewing machine of such kind at and near a lower feed dog 59. The difference of the machine from that shown in FIG. 4 is that a two-split vertical driving lever 63 is secured to a lower feed vertical motion shaft 62 at the tip thereof and surrounds a member 60 rotatably supported by the lower feed dog 59 at the tip thereof.

Figure 6:
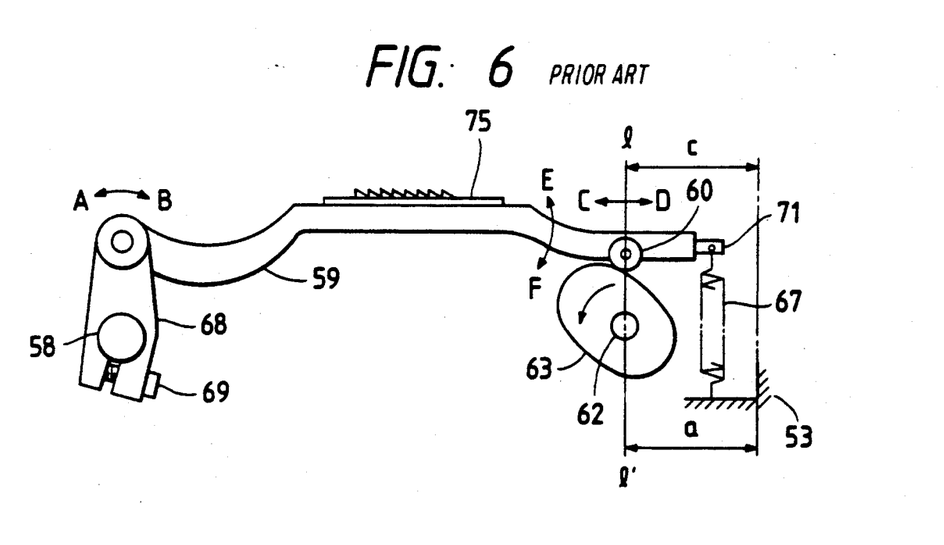
FIG. 6 is a view of the lower feed mechanism of yet another conventional differential vertical sewing machine.

FIG. 6 shows an enlarged partial view of another conventional differential vertical sewing machine at and near a lower feed dog 59. In the machine, a lower feed vertical motion shaft 62 is rotated, as differs from those shown in FIGS. 4 and 5, a cam 63 is secured to the shaft at the tip thereof, a cam follower 60 is attached to the portion of the lower feed dog 59, which is engaged with the cam, and a spring 67 engaged with the body of a head and a spring attaching member 71 provided on the dog at the tip thereof acts to apply an elastic force to prevent the cam follower from jumping from the cam.

The operation of the conventional sewing machine shown in FIG. 4 is described from now on. When torque is applied to the main shaft 1 by the motor not shown in the drawing, the shaft is rotated and the torque thereof is transmitted to the sections of the machine trough mechanisms coupled to the shaft. At the left-hand end of the main shaft 1, the vertical motion of the needle rod 13 and that of the thread take-up lever 14 are caused through the needle rod and thread take-up mechanism 12. At the central portion of the main shaft 1, the torque thereof is transmitted to the vertical shaft 15 through the engagement of the bevel gears 2 and 3, and the torque of the vertical shaft is transmitted to the lower shaft 18 through the engagement of the bevel gears 16 and 17 to rotate the shuttle hook 19. The rotation of the eccentric wheel 4 is converted into the vertical motion of the rod 49b through the reciprocative motion of the rod 5, the swing motion of the driving lever 45 and that of the driven lever 49a. The rotation of the eccentric wheel 6 is converted into the reciprocative motion of the rod 7, which causes the swing motion of the upper feed horizontal motion shaft 38 through the upper feed quantity controller 20. The swing motion of the shaft 38 causes that of the horizontal driving lever 40 and the horizontal motion of the upper feed dog 55 through the engagement of the two-split output portion 38o of the shaft and the member 39. Since the two-split front portion of the upper feed dog 55 is engaged with the cam follower 50 rotatively coupled to the lower portion of the rod 49b, the dog performs a vertical motion synchronized with the horizontal motion of the dog, so that the upper feed teeth 57 performs a pseudoelliptic feed motion. The rotation of the eccentric wheel 8 is converted into the reciprocative motion of the rod 9 and the swing motion of the feed vertical motion shaft 62, and causes the vertical motion of the member 60 rotatively coupled to the output portion 62o of the shaft. The rotation of the eccentric wheel 10 is converted into the reciprocative motion of the rod 11, which causes the swing motion of the lower feed horizontal motion shaft 58 through the lower feed quantity controller 29 so that the horizontal motion of the feed dog 59 coupled to the output portion 58o of the shaft. Since the two-split front portion of the dog 59 is engaged with the member 60, the dog performs a vertical motion synchronized with the horizontal motion thereof, so that feed teeth 75 perform a pseudo-elliptic feed motion. Since it is well known that the above-mentioned motions caused through the rotation of the main shaft 1 are organically synchronized with each other, it is not described in detail herein.

The quantity of an upper feed is controlled by swinging the upper feed control lever 25 to change the posture thereof. The quantity of a lower feed is controlled by swinging the lower feed control lever 34 to change the posture thereof. Mechanisms for changing the postures of the control levers 25 and 34 and mechanisms for maintaining the postures are not shown in the drawings.

Although lower feed mechanisms shown in FIGS. 4 and 5 differ from each other in the form of the feed dog 59 and that of the vertical driving lever 63, the mechanisms are nearly the same as each other in the operation of each portion thereof.

Although the operation of the lower feed horizontal motion shaft 58 of a lower feed mechanism shown in FIG. 6 is the same as that of the lower feed horizontal motion shaft 58 of the lower feed mechanism shown in FIG. 4, the lower feed vertical motion shaft 62 of the mechanism shown in FIG. 6 performs a rotary motion so that the cam 63 mounted on the shaft at the tip thereof is rotated. Since the cam follower 60 mounted on the feed dog 59 at the tip thereof in the lower feed mechanism shown in FIG. 6 is urged by the spring 67 so as to be engaged with the surface of the cam 63, the feed dog performs a vertical motion due to the rotation of the cam. Since the swing motion of the lower feed horizontal motion lever 68 and the rotary motion of the cam 63 in the mechanism shown in FIG. 6 are synchronized with each other as well as those in the mechanism shown in FIG. 4, feed teeth 75 perform a pseudo-elliptic feed motion.

Figure 7:
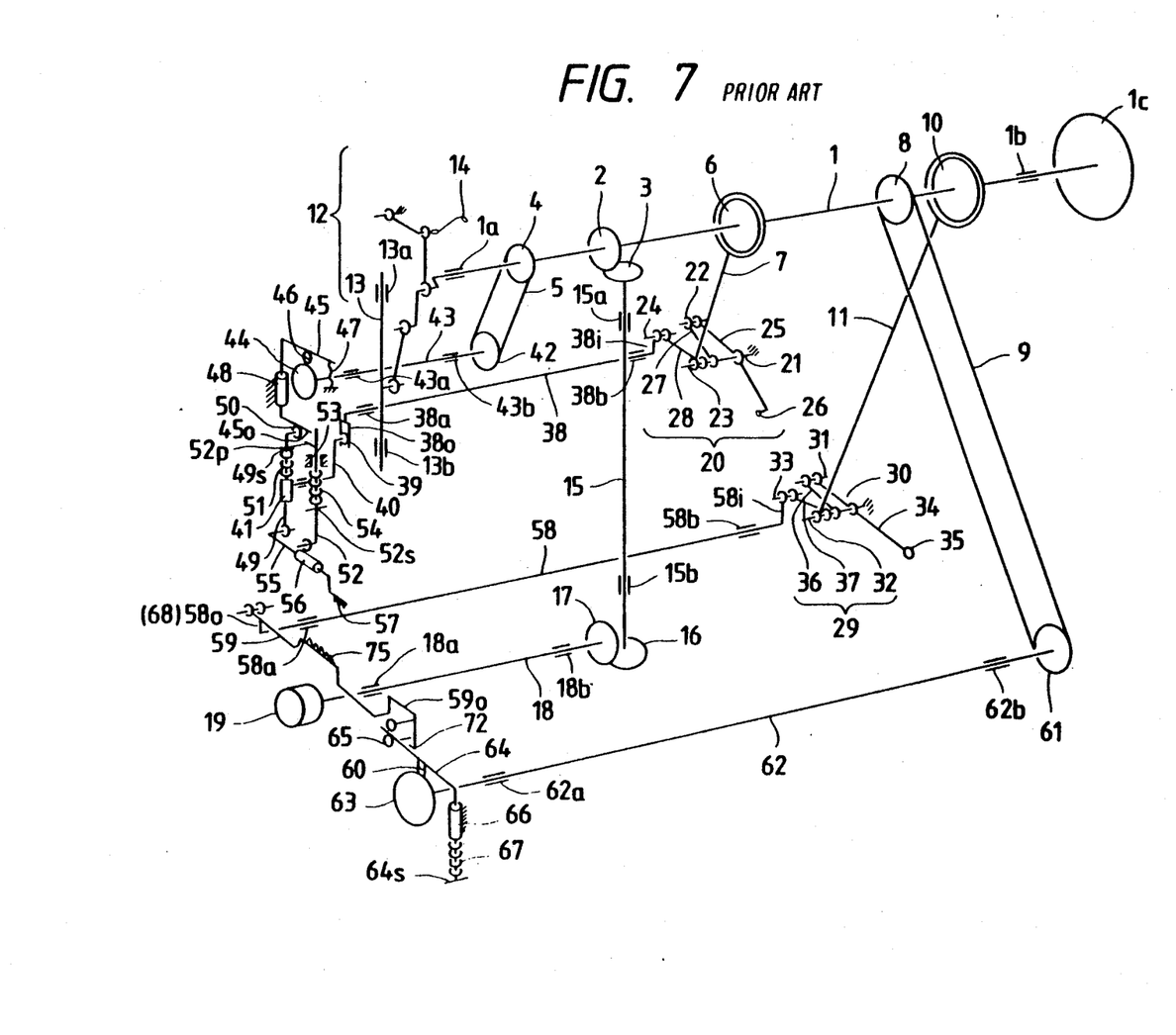
FIG. 7 is a structural view of the lower of yet another conventional differential vertical sewing machine employing a cam unit.

FIG. 7 is an enlarged partial view of another conventional differential vertical sewing machine in which a rotary shaft is provided instead of a vertically moving shaft, a cam is mounted on the rotary shaft at the tip thereof, a sliding block is provided to be guided by the body of a head so as to be straightly moved vertically and is engaged with the cam so as to perform the vertical motion, and feed teeth perform a vertical motion due to that of the block. The upper feed mechanism of the sewing machine is described from now on. In the mechanism, timing pulleys 4 and 8 are mounted on the central portion of a main shaft 1, a member 39 is rotatively coupled to the input end of a horizontal driving lever 40 and engaged with the two-split output portion 38o of an upper feed horizontal motion shaft 38, and a guide 41 provided at the output end of the shaft guides a driven lever 49 to move the lever straightly. A timing pulley 42 is mounted on the input portion of an upper feed vertical motion shaft 43 rotatably supported by bearings 43a and 43b, and is coupled to the timing pulley 4 by a timing belt 5. A cam 44 is mounted on the upper feed vertical motion shaft 43 at the output end thereof. A slider 45 is straightly moved vertically while being guided by a linear guide 48 secured to the head body 53. A cam follower 46 is attached to the upper arm of the slider 45 and engaged with the cam 44 by the elastic force of a spring 47. The slider is restricted by a means not shown in FIG. 7, so that the slider does not rotate about the axis of the straight motion thereof. The driven lever 49 is guided by the guide 41 at the output end of the horizontal driving lever 40. A cam follower 50 is attached to the driven lever 49 at the upper end thereof and engaged with the slider 45 by the upward elastic force of a spring 51 provided between the upper arm 49s of the driven lever and the guide 41. An upper feed dog 55 is rotatively coupled at the rear end thereof to the driven lever 49 at the lower end thereof and guided by an upper feed rest guide 56 rotatably supported by a block attaching rod 52 at the lower end thereof, so that the rest is slid. The rod 52 receives a downward elastic force from a spring 54 provided between the arm 52s of the rod and the head body 53, so that a presser not shown in FIG. 7 is usually at a standstill in contact with a needle plate not shown in FIG. 7. The upper arm 52p of the rod 52 is for lifting the lower arm 45o of the slider 45 when the rod is lifted by a lifter not shown in FIG. 7. The lower feed mechanism of the sewing machine is described from now on. In the mechanism, a lower feed vertical motion shaft 62 is rotatably supported by bearings 62a and 62b. A timing pulley 61 is mounted on the shaft 62 at the input end thereof and coupled to the timing pulley 8 by a timing belt 9. A cam 63 is mounted on the shaft 62 at the output end thereof. A slider 64 is straightly moved vertically while being guided by a linear guide 66 secure to the head body 53. A cam follower 60 is attached to the slider 64 at the upper portion thereof and engaged with the cam 63 by the elastic force of a spring 67 provided between the arm 64s of the slider at the lower end thereof and the linear guide 66. The slider 64 is restricted by a means not shown in FIG. 7, so that the slider does not rotate about the axis of the straight motion thereof.

Figure 8:
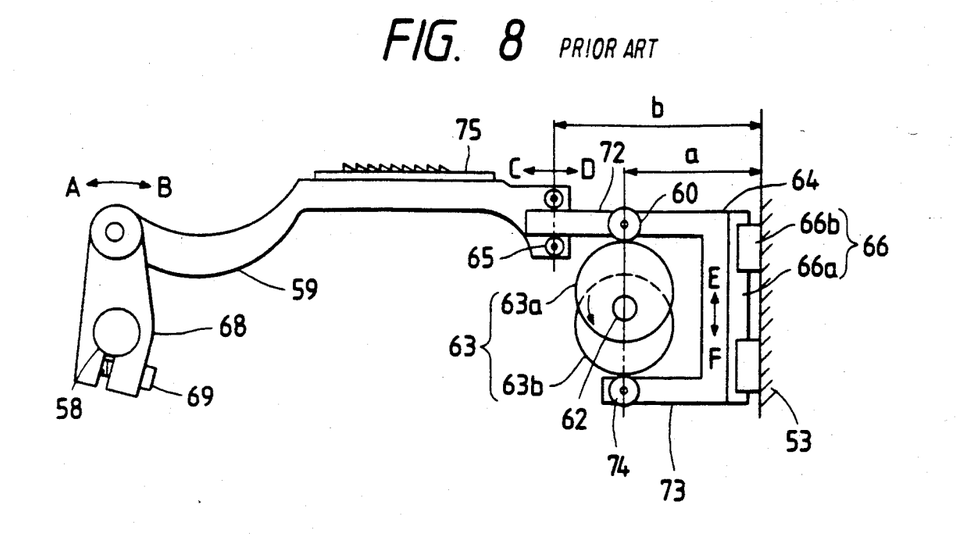
FIG. 8 is a view of the lower feed mechanism of yet another conventional differential vertical sewing machine.

FIG. 8 shows the case that the cam 63 is composed of a main cam 63a for causing the slider 64 to perform a desired motion, and an auxiliary cam 63b for preventing the cam follower 60 from jumping from the main cam. In that case, the cam follower 60 is engaged with the main cam 63a and attached to the slider 64, and another cam follower 74 is engaged with the auxiliary cam 63b and attached to the slider. The two cam followers 60 and 74 do not separate from the main and the auxiliary cams 63a and 63b due to the phase of the cam 63.

The operation of the sewing machine shown in FIG. 7 is described from now on. The motion of the needle rod and thread take-up mechanism 12 of the machine and the motion of the shuttle hook 19 thereof are the same as those of the sewing machine shown in FIG. 4. The torque of the main shaft 1 of the machine shown in FIG. 7 is transmitted to the upper feed vertical motion shaft 43 through the timing pulley 4, the timing belt 5 and the timing pulley 42 so that the cam 44 mounted on the shaft is rotated. The torque of the cam 44 acts through the cam follower 46 so that the slider 45 is straightly moved vertically while being guided by the head body 53, and the driven lever 49, which is coupled at the upper end thereof with the bottom of the slider through the cam follower 50 and guided by the guide portion 41 of the horizontal driving lever 40 so as to be straightly moved, is moved vertically. The torque of the main shaft 1 acts through an eccentric wheel 6, a rod 7 and an upper feed quantity controller 20 to swing an upper feed horizontal motion shaft 38 whose swing motion is converted into that of the horizontal driving lever 40 through the engagement of the two-split output end portion 38o of the upper feed horizontal motion shaft and the member 39 rotatively coupled to the lever. The swing motion of the lever 40 acts to swing the driven lever 49 which is guided by the guide portion 41 of the horizontal driving lever 40. Thus, the driven lever 49 performs both the vertical motion and the swing motion because of the torque of the main shaft 1. For that reason, the upper feed dog 55 rotatively coupled at the rear end thereof to the driven lever 49 at the lower end thereof and guided for sliding, at the front portion of the dog by an upper feed rest guide 56 rotatably supported by the block attaching rod 52 performs a horizontal motion and a swing motion so that upper feed teeth 57 attached to the bottom of the front portion of the dog perform a pseudo-elliptic feed motion. In the upper feed mechanism, the direction of the vertical motion of the driven lever 49 is reverse to that of the vertical motion of the upper feed teeth 57. In other words, the teeth 57 are moved down when the lever 49 is moved up. When the block attaching rod 52 is pushed up in the upper feed mechanism by a push-up means not shown in FIG. 7, the upper feed dog guide 56 is moved up so that the upper feed teeth 57 are moved up. In that case, since there is a gap between the upper arm 52p of the lifter attaching rod 52 and the lower engaging portion 45o of the slider block 45 as the rod is moved down, the upper feed dog 55 is rotated counterclockwise at the time of the upward motion of the rod. For that reason, when the rod 52 is pushed up, the bottoms of the upper feed teeth 57 are moved up to a position above that of the bottom of the presser not shown in FIG. 7. The horizontal motion of the lower feed mechanism of the sewing machine shown in FIG. 7 is the same as that of the lower feed mechanism of the sewing machine shown in FIG. 4. The torque of the main shaft 1 is transmitted to the lower feed vertical motion shaft 62 through the timing pulley 8, the timing belt 9 and the timing pulley 61 so that the cam 63 mounted on the shaft at the tip thereof is rotated. The torque of the cam 63 acts through the cam follower 60 so that the slider 64 is straightly moved vertically while being guided by the head body 53, and the front portion of the lower feed dog 59 fitted at the front end 59o thereof with a plurality of cam followers 65 engaged with the upper arm 72 of the slider 64 on the top and bottom of the arm is moved vertically. Since a horizontal motion is transmitted to the lower feed dog 59 at its rear end rotatively coupled to a lower feed horizontal motion lever 68, the lower feed teeth 75 attached to the top of the central portion of the dog perform a pseudo-elliptic feed motion.

In the case shown in FIG. 8, the cam 63 is composed of the main cam 63a as the body of the cam and the auxiliary cam 63b for preventing the main cam from jumping from the cam follower, one 60 of the plural cam followers 60 and 74 attached with a gap therebetween to the slider 64 is in contact with the main cam, and the other 74 of them is in contact with the auxiliary cam. Since the auxiliary cam 63b is shaped so that the plural cam followers 60 and 74 located at a prescribed distance from each other are always simultaneously in contact with the main cam 63a and the auxiliary cam, regardless of the phase of the cam 63, the cam followers 65 do not jump even if the rotation speed of the cam increases. Since the slider is disposed between the cam and the feed dog in the case shown in FIG. 8, the cam followers 60 and 74 are not moved in directions C and D as the feed dog is moved in the directions.

Figure 9A:
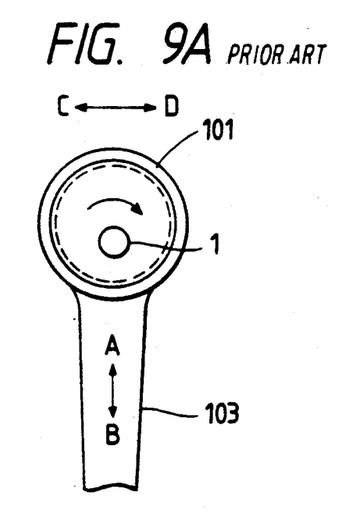
FIG. 9(a) is a front view of the eccentric wheel and rod of each of the sewing machines shown in FIGS. 4 and 7.
Figure 9B:
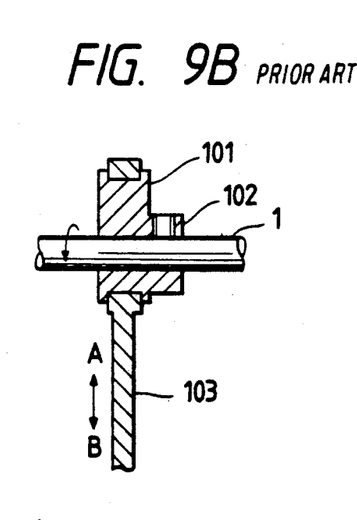
FIG. 9(b) is a longitudinally sectional view of the eccentric wheel and the rod.

FIG. 9 shows the eccentric wheels, the rod and the vicinity of them in each of the conventional sewing machines shown in FIGS. 4 and 7. The eccentric wheel 101, which is denoted by 8 in FIG. 4 and by 10 in FIG. 7, is secured to the main shaft 1 by a screw 102, and the rod 103, which is denoted by 9 in FIG. 4 and by 11 in FIG. 7, is rotatively coupled to the wheel. When the main shaft 1 shown in each of FIGS. 4 and 7 is rotated, the eccentric wheel 101 secured to the shaft is rotated so that the rod 103 is swung in directions C and D and directions A and B, or, to be exact, the center of the ring of the rod at the upper end thereof performs a circular motion and the tip of the rod, which is not shown in FIG. 9, is moved in the directions A and B.

Figure 10:
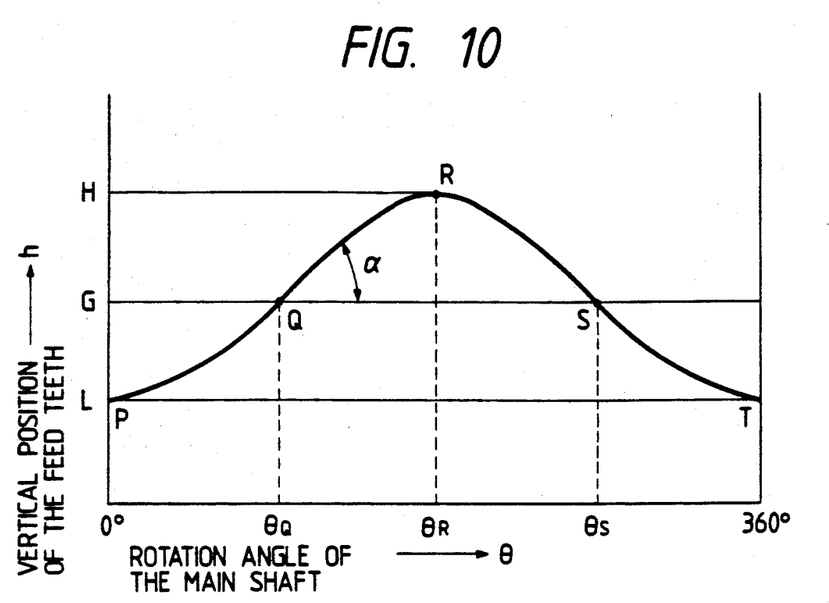
FIGS. 10 and 11 are time charts of the vertical motions of feed teeth.
Figure 11:
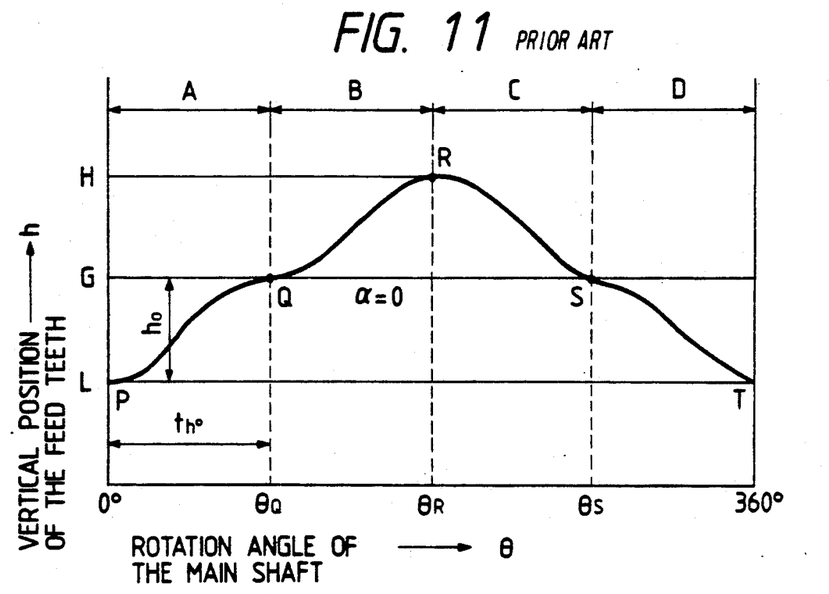

FIG. 10 shows the vertical motion of the feed teeth 27, which is caused by the above-mentioned motion of the tip of the rod 103, in the sewing machine shown in FIG. 4 and not having a cam unit. FIG. 11 shows the vertical motion of the feed teeth 75, which is caused by the above-mentioned motion of the tip of the rod 103, in the sewing machine shown in FIG. 7 and having the cam unit.

FIG. 10 shows the vertical motion of the feed dog 59 and the feed teeth 75 in their elliptic motion during the sewing operation of the sewing machine shown in FIG. 4 and not having the cam unit. In FIG. 10, the axis of abscissas and that of ordinates denote the rotation angle $\theta$ of the main shaft 1 and the vertical position h of the feed teeth 75, respectively. The motion of the feed teeth 75 during the single round of the rotation of the msin shaft 1 or during a single stitch is denoted by a curve P→Q→R→S→T shown in FIG. 10. A point P or T shown in FIG. 10 indicates the bottom dead point of the feed teeth 75. A point R shown in FIG. 10 indicates the top dead point of the feed teeth 75. A point Q shown in FIG. 10 indicates the instant at which the feed teeth 75 come up out of a needle plate not shown in the drawings or the teeth collide against a presser. A point S shown in FIG. 10 indicates the instant at which the feed teeth 75 go into the needle plate or the teeth separate from the presser. As mentioned above, the feed teeth 75 collide against the presser at the point Q at which the phase of the main shaft 1 is $\theta Q$, and the teeth separate from the presser at the point S at which the phase of the main shaft is $\theta S$. The larger the angle $\alpha$ between the tangent on the curve and the positive direction of the axis of abscissas is, the higher the speed of the vertical motion of the feed teeth 75 is. As understood from FIG. 10, the feed teeth 75 collide against the presser at the time of the maximum speed of the upward motion of the teeth.

FIG. 11 shows the vertical motion of the feed dog 59 and the feed teeth 75 in their elliptic motion during the sewing operation of the sewing machine shown in FIG. 7 and having the cam unit. The axis of abscissas and that of ordinates shown in FIG. 11 denote the rotation angle $\theta$ of the main shaft 1 and the vertical position h of the feed teeth 75, respectively. Symbols shown in FIG. 11 denote the same as those in FIG. 10 except symbols A, B, C and D. The vertical motion of the feed teeth 75 is denoted by a curve P→Q→R→S→T shown in FIG. 11. The speed of the vertical motion of the feed teeth 75 is zero ($\alpha=0$) at a point Q at which the teeth collide against a presser, and at a point S at which the teeth separate from the presser. The feed teeth 75 are moved up at a prescribed speed toward the collision point Q, and moved up at a sharply decreasing speed in the immediate vicinity of the collision point. The speed of the upward motion of the teeth 75 instantaneously becomes zero at the time of the arrival at the collision point Q. Immediately after the arrival at the collision point Q, the teeth 75 are moved up further while the speed thereof increases gradually. At a point H or R indicating the top dead point of the motion of the teeth 75, the teeth begin to be moved down. The speed of the downward motion of the teeth 75 instantaneously becomes zero at a point S due to an action reverse to that in the above-mentioned upward motion of the teeth, so that the teeth are put out of contact with the presser. Such operation is repeated to feed a sewn object.

In the sewing machines employing the cam units shown in FIGS. 6 and 8, it is enabled by appropriately predetermining the form of the cam that the feed teeth 75 are caused to perform the motion shown in FIG. 11. For the motion, the cam has such a form that the speed of the collision of the feed teeth 75 with the presser is approximate to zero. When the lower feed horizontal output lever 68 is swung in the directions A and B in the sewing machine shown in FIG. 6, the cam follower 60 is moved in the directions C and D so that the cam follower deviates from a vertical line $\lambda$-$\lambda'$ extending through a cam shaft 62. For that reason, it is complicated to design the form of the cam 63. This is a problem. Besides, it is geometrically difficult to provide a positive cam. This is also a problem. The sewing machine shown in FIG. 8 was developed as one of means for solving the problems. However, since the sliding block 64 is added to prevent the cam follower 74 from deviating the vertical line $\lambda$-$\lambda'$, the sewing machine is complicated.

Since the conventional sewing machines are constituted as described above, the vertical motion shaft 62 needs to be rotated if the cam unit is provided to reduce the speed of the collision of the feed teeth 75. This is a problem. If a positive cam such as the lower feed vertical motion cam 63 is provided to prevent a cam follower from jumping from the cam when the cam is rotated rapidly, the cam follower 65 and the slider 64, which are moved straightly, need to be provided so that the constitution of the machines is complicated. This is also a problem.

SUMMARY OF THE INVENTION

The present invention was made in order to solve the above-mentioned problems.

Accordingly, it is an object of the present invention to provide a cam unit capable of causing the shaft of a section to perform a desired motion, without changing the kind of the motion of the shaft and adding a straightly moved member to the cam unit to complicate it. The cam unit comprises a main cam, a first auxiliary cam, a second auxiliary cam, a rod, a motion transmission means, a jump prevention means, and a shaft. The first auxiliary cam is provided in contact with the main cam. The second auxiliary cam is provided in contact with the first auxiliary cam. The rod is provided between the main cam and the second auxiliary cam and has a slenderly shaped hole in which the peripheral portion of the first auxiliary cam is located in contact with the rod so that the rod is swing while being guided by the first auxiliary cam. The motion transmission means is secured to the rod and located on the peripheral portion of the main cam so as to move the rod in accordance with the contour of the main cam. The jump prevention means is secured to the rod and located on the peripheral portion of the second auxiliary cam so as to prevent the motion transmission means from jumping from the main cam. The shaft of the cam unit extends through all the cams. A positive cam is constituted by the main cam, the auxiliary cams and the rod without guiding a driven member to straightly move it. A motion is directly transmitted to a swinging member by the cam unit. For these reasons, it is enabled without complicating the cam unit that the unit causes the shaft of the section to perform the desired motion.

It is another object of the present invention t provide a sewing machine which employs such a cam unit and is high in the degree of freedom of design or in the degree of easiness of causing the output section of the machine to perform a desired motion and is simple in constitution. The sewing machine includes the cam unit, and upper feed dog, upper feed teeth, and lower feed teeth. The cam unit comprises a main cam, a first auxiliary cam, a second auxiliary cam, a rod, a motion transmission means, a jump prevention means, and a main shaft. The first auxiliary cam is provided in contact with the main cam. The second auxiliary cam is provided in contact with the first auxiliary cam. The rod is provided between the main cam and the second auxiliary cam and has a slenderly shaped hole in which the peripheral portion of the first auxiliary cam is located in contact with the rod so that the rod is swung while being guided by the first auxiliary cam. The motion transmission means is secured to the rod and located on the peripheral portion of the main cam so as to move the rod in accordance with the contour of the main cam. The jump prevention means is secured to the rod and located on the peripheral portion of the second auxiliary cam so as to prevent the motion transmission means from jumping from the main cam. The main shaft extends through all the cams so as to transmit torque. The upper feed dog is supported by a vertical motion rod supported to be vertically movable and can be reciprocated in conjunction with the rotation of the main shaft. The upper feed teeth are provided on the upper feed dog. The lower feed teeth are provided so that the lower feed teeth can be put into and out of contact with the upper feed teeth by the cam unit as the torque of the main shaft is transmitted to the cams. The cam unit is capable of causing the feed section or the like of the sewing machine to perform a desired motion. The speed of collision of the feed teeth with a presser can be made nearly zero by the simple cam unit without rotating a vertical motion shaft and using a special member such as a cam follower and a slider.

DETAILED DESCRIPTION OF EXEMPLARY EMBODIMENTS

Embodiments of the present invention are hereafter described in detail with reference to the drawings attached hereto.

Figure 1A:
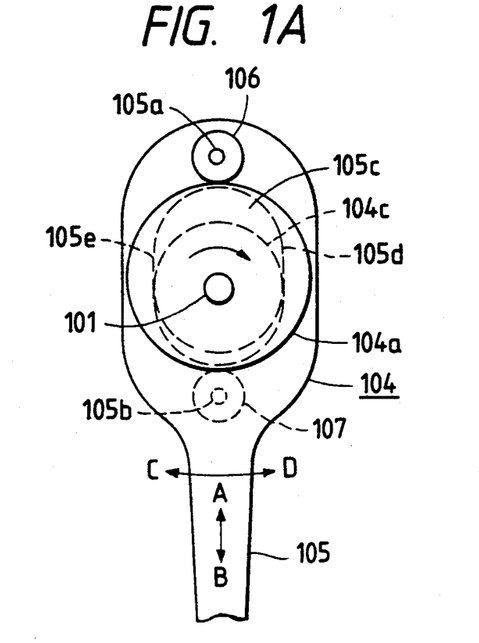
FIG. 1(a) is a front view of a cam unit which is an embodiment of the present invention.
Figure 1B:
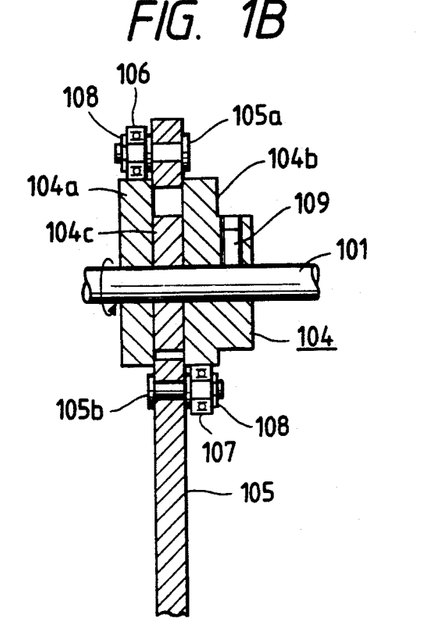
FIG. 1(b) is a longitudinally sectional view of the cam unit.

FIG. 1 shows a cam unit 104 which is one of the embodiments. The cam unit 104 includes a main cam 104a, auxiliary cams (A and B) 104b and 104c, a driven rod 105, a cam follower 106, a cam follower 107, and stop rings 108. The main cam 104a is shaped as a plate. The auxiliary cam (B) 104c is shaped as a disk and smaller in diameter than the main cam 104a. The other auxiliary cam (A) 104b is shaped as a plate, provided in contact with the preceding auxiliary cam (B) 104c, and nearly equal in size to the main cam. The driven rod 105 is provided between the main cam 104a and the auxiliary cam (A) 104b and has a slenderly shaped hole 105c in which the peripheral portion of the auxiliary cam (B) 104c is located in contact with the driven rod. The cam unit 104 also includes a main shaft 101 extending through the main cam 104a and the auxiliary cams (A and B) 104b and 104c in the axial directions thereof. The main cam 104a and the auxiliary cams (B and A) 104c and 104b are secured to each other and then secured to the main shaft 101 by a screw 109. The cam follower 106 is a bearing provided on the peripheral portion of the main cam 104a so as to serve as a motion transmission means for moving the rod 105 in accordance with the contour and rotation of the main cam. The cam follower 106 is secured with one of the stop rings 108 to a pin 105a calked to the rod 105. The cam follower 107 is a bearing provided on the peripheral portion of the auxiliary cam (A) 104b so as to serve as a jump prevention means for preventing the cam follower 106 from jumping from the main cam 104a. The cam follower 107 is secured with the other of the stop rings 108 to a pin 105b calked to the rod 105. The head of the rod 105 has the slenderly shaped hole 105c in which the auxiliary cam (B) 104c is disposed coaxially with the main shaft 101. The rod 105 has two flat facets 105d and 105e extending along the major axis of the slenderly shaped hole 105c. The auxiliary cam (B) 104c is guided by the flat facets 105d and 105e so that an imaginary straight line extends on the axis of the cam followers 106 and 107 and the axis of the main shaft 101.

Figure 2:
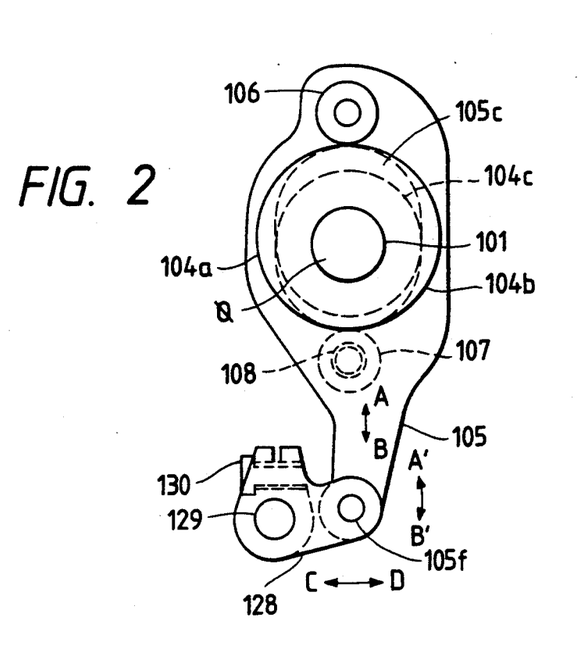
FIG. 2 is a front view of the feed transmission section of a sewing machine, which employs such a cam unit.

FIG. 2 shows a feed transmission section including the cam unit 104 instead of an eccentric wheel for a sewing machine. The feed transmission section also includes a feed vertical motion shaft 129 and a link 128 secured to the shaft by a screw 130 and rotatively coupled at the free end of the link to the rod 105 at the lower end thereof by a pin 105f.

The operation of the cam unit 104 is described from now on. When the main shaft 101 is rotated, the rod 105 is reciprocated in directions A and B in accordance with the contour curve of the main cam 104a because the cam follower 107 prevents the other cam follower 106 from jumping from the main cam and the auxiliary cam (B) 104c is fitted on the flat facets 105d and 105e on the slenderly shaped hole 105c. Since the auxiliary cam (B) 104c is fitted on the flat facets 105d and 105e to perform such restriction that the imaginary straight line always extends on the axis of the cam followers 106 and 107 and the axis of the main cam 104a, the main cam and the cam follower 106 always remain engaged with each other, the auxiliary cam (A) 104b and the cam follower 107 always remain engaged with each other and the cam followers 106 and 107 are prevented from jumping from the rolling surfaces of the main cam and the auxiliary cam (A) 104b in the rapid rotation of the cams. The rod 105 is accurately reciprocated in the directions A and B in accordance with the contour curve of the main cam 104a as the cams are rotated by the main shaft 101. Since the rod 105 is not guided to be straightly moved, the rod is enabled to be swung in directions C and D about the main shaft 101 while being reciprocated in the directions A and B. In other words, the rod 105, which is moved by the cam, is not confined to being guided to be straightly moved.

In the feed transmission section shown in FIG. 2, the rod 105 is reciprocated in the directions A and B and the link 128 coupled to the rod by the pin 105f is swung in directions A' and B' about the shaft 129 as the main cam 104 is rotated by the main shaft 101. Although the pin 105f provided at the lower end of the rod 105 is required to be moved in the directions C and D, due to the swing of the link 128, the requirement is not a problem because the rod is enabled to be swung in the directions C and D about the axis 0 of the main shaft 101.

Figure 3:
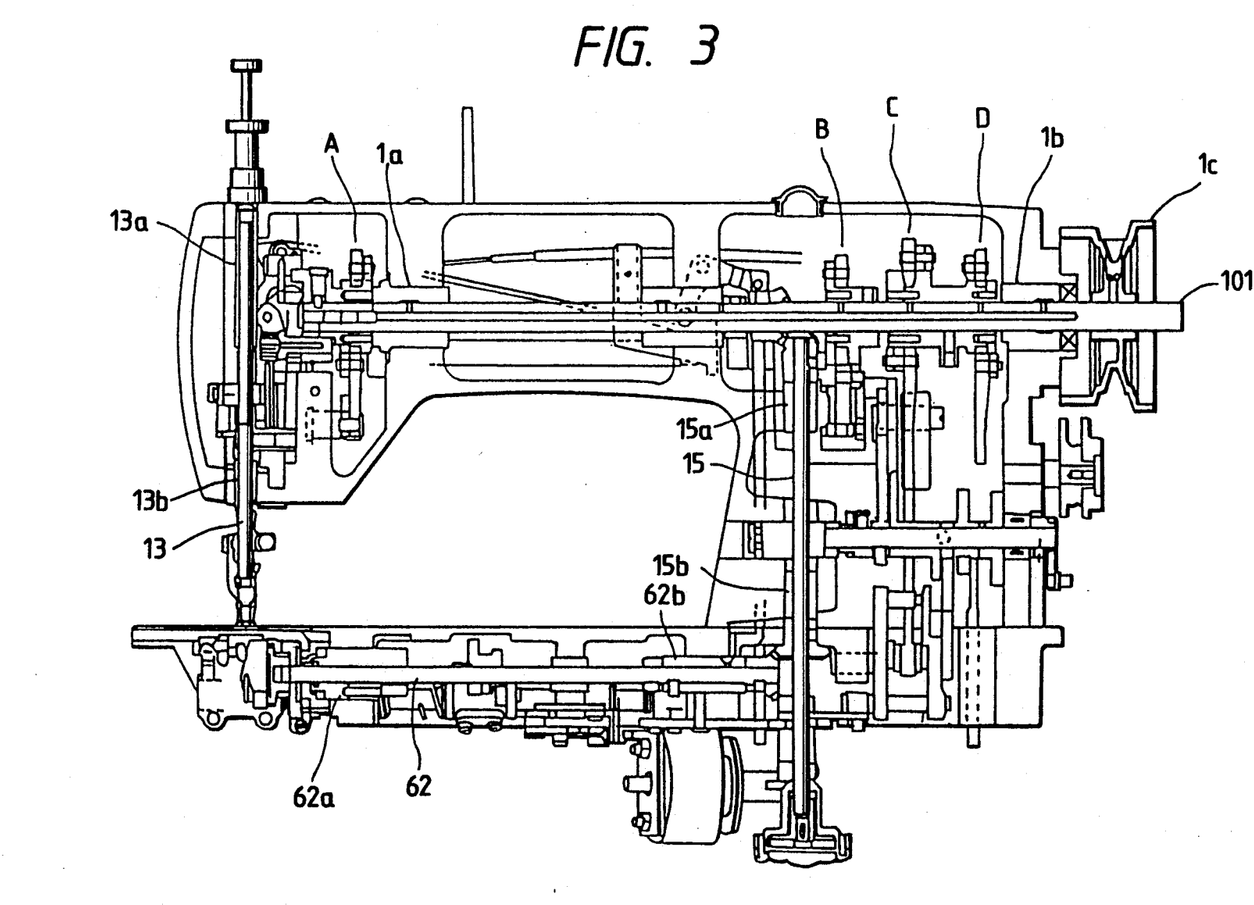
FIG. 3 is a schematic view of a sewing machine employing such cam units.

FIG. 3 shows a differential vertical sewing machine which employs four such cam units instead of eccentric wheels and is the other of the embodiments. The cam units are provided in positions A, B, C and D. The same reference symbols in FIGS. 3 and 4 denote equivalents. The cam units in the positions A, B, C and D are for an upper feed vertical motion, an upper feed horizontal motion, a lower feed horizontal motion and a lower feed vertical motion, respectively. The motions are caused in the upper and lower feed sections of the sewing machine in accordance with the contour curves of the cams of the cam units as the main shaft 101 of the machine is rotated. The operation of the other sections of the sewing machine, which is caused by the rotation of the main shaft 101, is the same as that of the conventional sewing machines.

Although the cam follower 107 for preventing the other cam follower 106 from jumping from the main cam 104a is made of the bearing in the embodiments described above, the present invention is not confined thereto but may be otherwise embodied so that the preceding cam follower is made of a sliding roller or a pin not having a rotary portion. Although the auxiliary cams (A and B) 104b and 104c are integrated with each other in the embodiments, the present invention is not confined thereto but may be otherwise embodied so that the auxiliary cams are separate from each other and secured to the main shaft 101. The auxiliary cam (B) 104c may be substituted by the main shaft 101. As far as the slenderly shaped hole 105c of the rod 105 functions to guide the auxiliary cam (B) 104c, the form of the hole may differ from that shown in FIG. 1. Although the cam units are applied to the main shaft of the differential vertical sewing machine of the vertical needle type, the cam units may be applied to the motion transmission sections of sewing machines of various types.

What is claimed is:

1. A cam unit comprising:
   a main cam;
   a first auxiliary cam provided in contact with said main cam;
   a second auxiliary cam provided in contact with said first auxiliary cam;
   a rod provided between said main cam and said second auxiliary cam and having a slenderly shaped hole wherein a peripheral portion of said first auxiliary cam is located in contact with said rod so that said rod is swung while being guided by said first auxiliary cam;
   a motion transmission means secured to said rod and located on a peripheral portion of said main cam for moving said rod in accordance with a contour of said main cam;
   a jump prevention means secured to said rod and located on a peripheral portion of said second auxiliary cam for preventing said motion transmission means from jumping from said main cam; and
   a shaft extending through all said cams.

2. A cam unit according to claim 1, wherein said main cam and said first and second auxiliary cams are secured to each other and then secured to said shaft by a screw.

3. A cam unit according to claim 1, wherein said motion transmission means is a first cam follower for moving the rod in accordance with the contour and rotation of said main cam.

4. A cam unit according to claim 3, wherein said first cam follower is secured with a first stop ring to a pin calked to said rod.

5. A cam unit according to claim 3, wherein said first cam follower is a bearing.

6. A cam unit according to claim 1, wherein said jump prevention means is a second cam follower for preventing said first cam follower from jumping from said main cam.

7. A cam unit according to claim 6, wherein said second cam follower is secured with a second stop ring to a pin calked to the rod.

8. A cam unit according to claim 6, wherein said second cam follower is a bearing.

9. A sewing machine wherein a cam unit, an upper feed dog, upper feed teeth and lower feed teeth are included; said cam unit comprises a main cam, a first auxiliary cam, a second auxiliary cam, a rod, a motion transmission means, a jump prevention means and a main shaft; said first auxiliary cam is provided in contact with said main cam; said second auxiliary cam is provided in contact with said first auxiliary cam; said rod is provided between said main cam and said second auxiliary cam and has a slenderly shaped hole in which a peripheral portion of said first auxiliary cam is located in contact with said rod so that said rod is swung while being guided by said first auxiliary cam; said motion transmission means is secured to said rod and located on a peripheral portion of said main cam so as to move said rod in accordance with a contour of said main cam; said jump prevention means is secured to said rod and located on a peripheral portion of said second auxiliary cam so as to prevent said motion transmission means from jumping from said main cam; said main shaft extends through all said cams so as to transmit torque; said upper feed dog is supported by a vertical motion rod supported to be vertically movable and can be reciprocated in conjunction with the rotation of said main shaft; said upper feed teeth are provided on said upper feed dog; and said lower feed teeth are provided so that said lower feed teeth can be put into and out of contact with said upper feed teeth by said cam unit as the torque of said shaft is transmitted to all said cams.

* * * * *